United States Patent
Gobbs et al.

(10) Patent No.: US 9,415,632 B2
(45) Date of Patent: Aug. 16, 2016

(54) WHEEL ASSEMBLY SEAL

(71) Applicant: Crown Parts and Machine Inc., Billings, MT (US)

(72) Inventors: Lane R. Gobbs, Townsend, MT (US); Derek L. Hansen, Laurel, MT (US); Kenneth P. Pitman, Billings, MT (US)

(73) Assignee: Crown Parts and Machine Inc., Billings, MT (US)

( * ) Notice: Subject to any disclaimer, the term of this patent is extended or adjusted under 35 U.S.C. 154(b) by 0 days.

(21) Appl. No.: 14/990,472

(22) Filed: Jan. 7, 2016

(65) Prior Publication Data

US 2016/0114625 A1 Apr. 28, 2016

Related U.S. Application Data

(63) Continuation of application No. 13/952,390, filed on Jul. 26, 2013, now Pat. No. 9,259,965.

(51) Int. Cl.
*B60B 27/00* (2006.01)

(52) U.S. Cl.
CPC ........... *B60B 27/0073* (2013.01); *B60B 27/001* (2013.01); *B60B 27/0052* (2013.01); *B60B 2320/10* (2013.01); *B60B 2380/14* (2013.01); *B60B 2900/5118* (2013.01)

(58) Field of Classification Search
CPC ...................................................... B62B 27/00
See application file for complete search history.

(56) References Cited

U.S. PATENT DOCUMENTS

| | | | | |
|---|---|---|---|---|
| 3,027,975 A | * | 4/1962 | Erickson | B60B 27/02 184/106 |
| 7,585,031 B2 | * | 9/2009 | White | B60B 27/001 301/105.1 |
| 9,259,965 B2 | | 2/2016 | Gobbs | |

OTHER PUBLICATIONS

Gobbs, Lane R.; Non-Final Office Action for U.S. Appl. No. 13/952,390, filed Jul. 26, 2013, mailed May 19, 2015, 12 pgs.
Gobbs, Lane R.; Notice of Allowance for U.S. Appl. No. 13/952,390, filed Jul. 26, 2013, mailed Oct. 13, 2015, 8 pgs.
Gobbs, Lane R.; U.S. Patent Application entitled: Wheel Assembly Seal having U.S. Appl. No. 13/952,390, filed Jul. 26, 2013, 37 pgs.
Image of cross-section of front wheel assembly of Komatsu 930E haul truck, the Komatsu 930E haul truck publicly for sale prior to Jul. 26, 2013, 1 pg.
Gobbs, Lane R.; Issue Notification for U.S. Appl. No. 13/952,390, filed Jul. 26, 2013, mailed Jan. 27, 2016, 1 pg.
Gobbs, Lane R.; Office Action for Canadian application No. 2,857,466, filed Jul. 22, 2014, mailed Apr. 8, 2016, 3 pgs.

* cited by examiner

*Primary Examiner* — John Walters
*Assistant Examiner* — James Triggs
(74) *Attorney, Agent, or Firm* — Taylor English Duma LLP

(57) ABSTRACT

A wheel assembly includes a spindle; a wheel hub rotatable relative to the spindle; a seal mounted between the spindle and the wheel hub, the spindle, the wheel hub, and the seal defining a sealed cavity, the seal coupled to an inner end of the wheel hub and a mounting flange of the spindle; and a bearing mounted between the spindle and the wheel hub within the sealed cavity, the wheel hub configured to rotate on the bearing relative to the spindle.

20 Claims, 16 Drawing Sheets

WHEEL ASSEMBLY SEAL

REFERENCE TO RELATED APPLICATIONS

This application is a continuation of U.S. application Ser. No. 13/952,390, filed Jul. 26, 2013, which is hereby specifically incorporated by reference herein in its entirety.

TECHNICAL FIELD

The current disclosure relates to wheel assemblies. Particularly, the current disclosure relates to wheel assembly seals.

BACKGROUND

Vehicles, including haul trucks such as the Komatsu 930E haul truck, have wheel assemblies that may include a wheel hub mounted on a spindle. A roller bearing may be mounted between the wheel hub and spindle to facilitate rotation of the wheel hub relative to the spindle. The roller bearing may be oiled allow for smooth rotation of the bearings of the roller bearing.

SUMMARY

Disclosed is a wheel assembly including a spindle; a wheel hub rotatable relative to the spindle; a seal mounted between the spindle and the wheel hub, the spindle, the wheel hub, and the seal defining a sealed cavity, the seal coupled to an inner end of the wheel hub and a mounting flange of the spindle; and a bearing mounted between the spindle and the wheel hub within the sealed cavity, the wheel hub configured to rotate on the bearing relative to the spindle.

Also disclosed is a wheel assembly including a spindle; a wheel hub rotatable relative to the spindle; a seal mounted between the spindle and the wheel hub, the spindle, the wheel hub, and the seal defining a sealed cavity, the seal comprising a first portion coupled to the wheel hub and a second portion coupled to the spindle, the first portion configured to rotate relative to the second portion about an axis, the first portion defining a first face sealing surface and the second portion defining a second face sealing surface contacting the first face sealing surface, the first face sealing surface and the second face sealing surface facing in axial directions defined by the axis of the seal; and a bearing mounted between the spindle and the wheel hub within the sealed cavity, the wheel hub configured to rotate on the bearing relative to the spindle.

Also disclosed is a method of forming a sealed cavity in a wheel assembly, the wheel assembly comprising a wheel hub, a spindle, a heat-generating device, and at least one bearing, the wheel hub rotatable relative to the spindle, the method including mounting a seal on an inner end of the wheel hub and a mounting flange of the spindle, the seal separating the at least one bearing from the heat-generating device; creating a sealed cavity between the wheel hub and the spindle with the seal, the at least one bearing mounted within the sealed cavity; and filling bearing oil into the sealed cavity.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Disclosed is a wheel assembly seal and associated methods, systems, devices, and various apparatus. The wheel assembly includes a wheel hub, a spindle, and the seal between the wheel hub and the spindle. It would be understood by one of skill in the art that the disclosed wheel assembly seal is described in but a few exemplary embodiments among many. No particular terminology or description should be considered limiting on the disclosure or the scope of any claims issuing therefrom.

Figure 1:
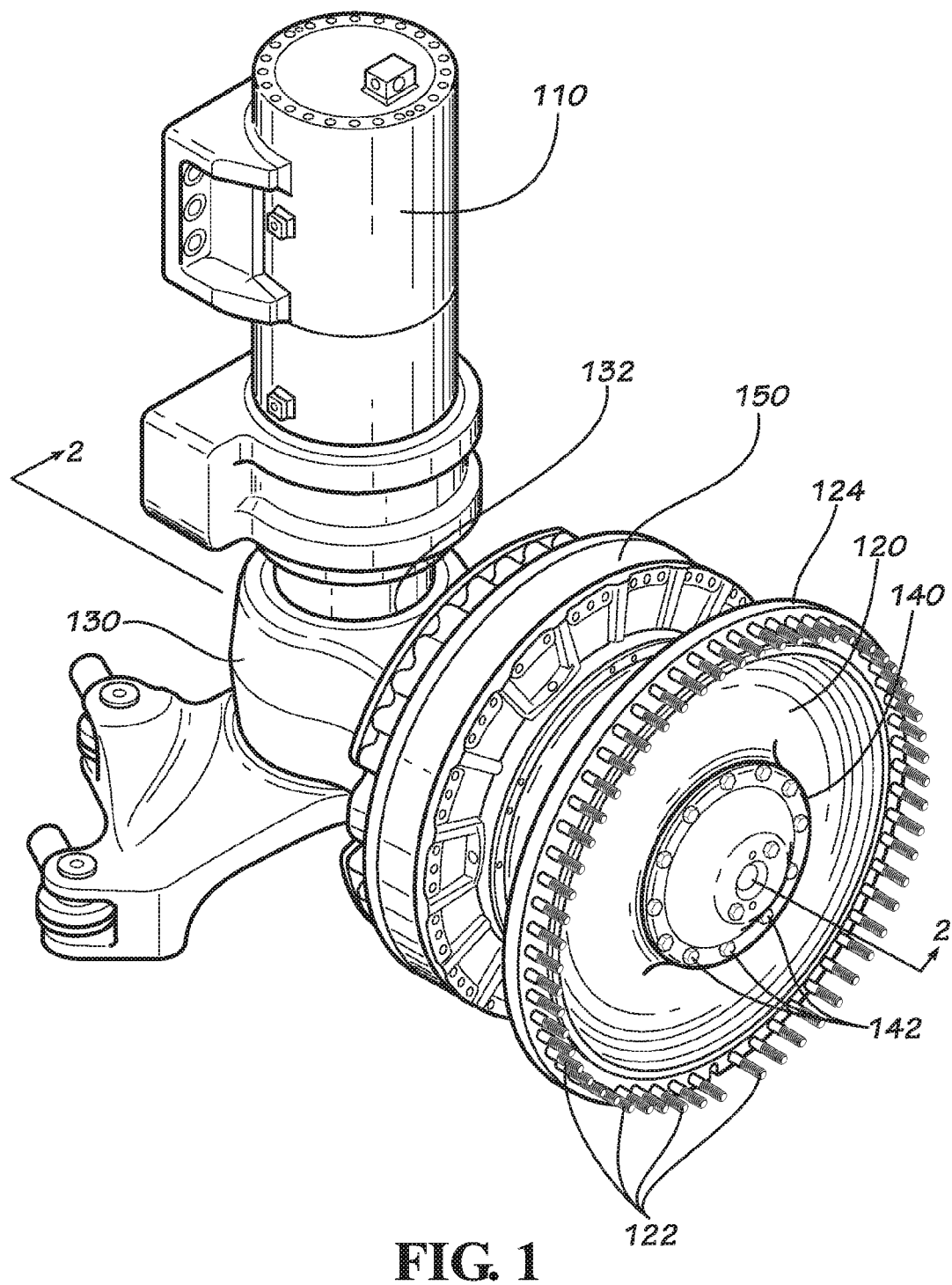
FIG. 1 is a perspective view of a wheel assembly in accord with embodiments of the current disclosure.

One embodiment of a wheel assembly 100 is disclosed and described in FIG. 1. The wheel assembly 100 is the front wheel assembly of a Komatsu 930E haul truck, though various wheel assemblies of various vehicles, including other haul trucks, may be present in various embodiments. The wheel assembly 100 may be mounted on a suspension cylinder 110. The wheel assembly 100 includes a wheel hub 120, a spindle 130, a cover 140, and a brake assembly 150. A wheel flange 124 of the wheel hub 120 is provided with a plurality of bolts 122 extending therethrough for bolting a tire to the wheel hub 120. The wheel hub 120 is rotatably mounted on the spindle 130 and the brake assembly 150 is coupled to both the wheel hub 120 and the spindle 130. The cover 140 is fastened to the wheel hub 120 by a plurality of bolts 142. The suspension cylinder 110 extends through a mounting bore 132 of the spindle 130.

Figure 2:
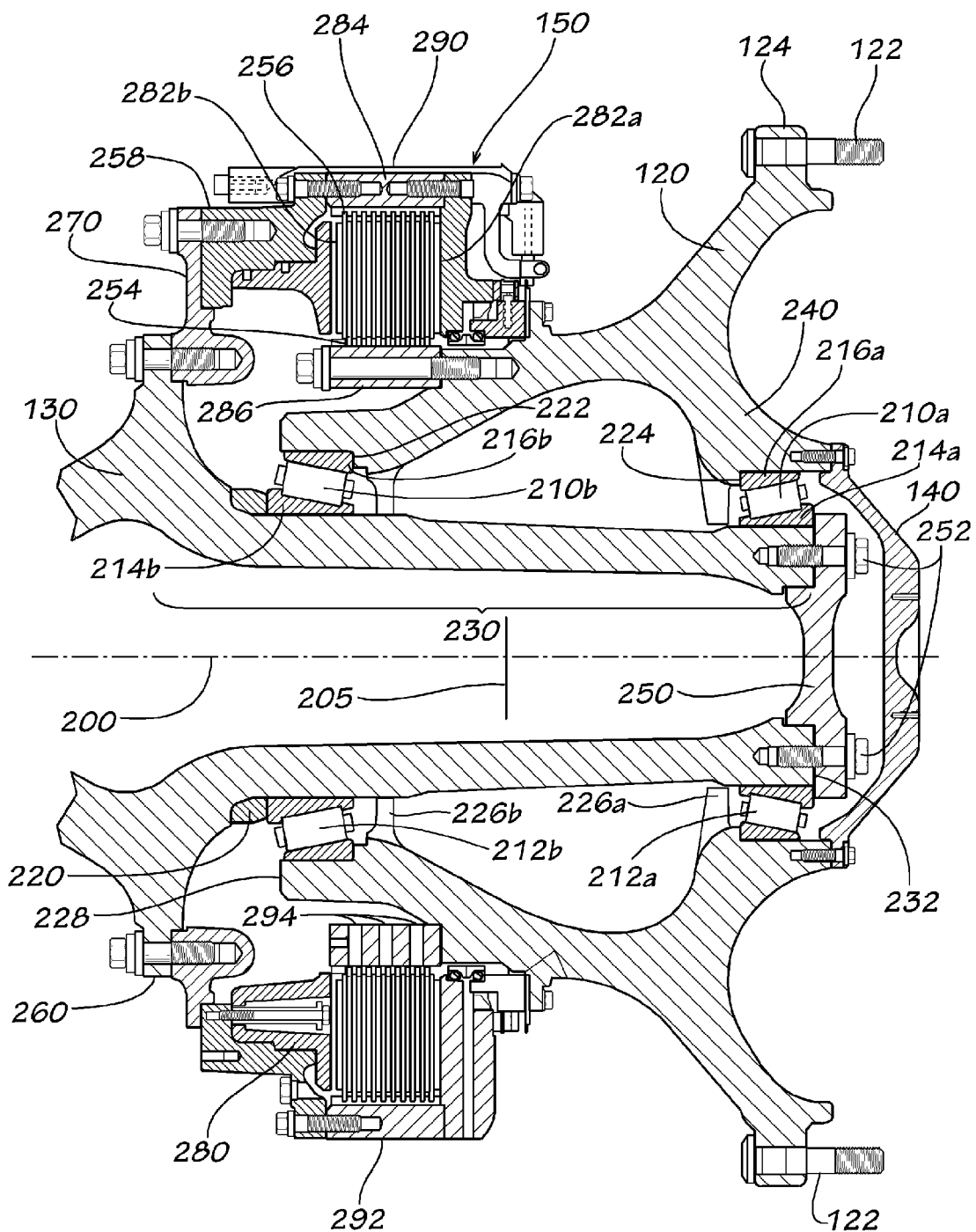
FIG. 2 is a cross-sectional view of the wheel assembly of FIG. 1 taken along line 2-2.

FIG. 2 shows a cross-section of the wheel assembly 100 taken along line 2-2 prior to any modification of the wheel assembly 100. As shown in FIG. 2, an axial direction 200 extends through the axis of the spindle 130, and a radial direction 205 extends transverse to the axial direction 200. The axial direction 200 extends inwardly from an outer end 232 of the spindle 130, the outer end 232 of the spindle 130 facing outward from wheel assembly 100 away from the vehicle that the wheel assembly 100 is installed on. The spindle 130 includes a wheel hub attachment portion 230 sized to be inserted into the wheel hub 120. The wheel hub 120 is mounted around the wheel hub attachment portion 230 on a pair of roller bearings 210a,b. Roller bearings 210a,b are tapered roller bearings, such as tapered roller bearings sold by The Timken Company, though other types of bearings may be used in various embodiments. Each roller bearing 210a,b includes a plurality of cylindrical rollers 212a,b held between an inner ring 214a,b and an outer ring 216a,b, respectively. The outer rings 216a,b may rotate relative to inner rings 214a,b, respectively. The outer rings 216a,b are engaged with the wheel hub 120 and the inner rings 214a,b are engaged with the spindle 130, thereby allowing the wheel hub 120 to rotate relative to the spindle 130.

The roller bearing 210b is held in place on the wheel hub attachment portion 230 of the spindle 130 by a bearing spacer 220 and by an inner retaining shoulder 222 formed in an inner end 228 of the wheel hub 120. The roller bearing 210a is held in place by a bearing retainer 250 and by an outer retaining shoulder 224 formed in an outer end 240 of the wheel hub 120. The bearing retainer 250 is coupled to the outer end 232 of the spindle 130 by a plurality of bolts 252 extending through the bearing retainer 250, though the bearing retainer 250 may be coupled to the spindle 130 by any method in various embodiments, including welding, gluing, or being formed integrally with the spindle 130.

The bearing retainer 250 also retains the wheel hub 120 on the spindle 130. The spindle 130 includes a mounting flange 260 formed in the spindle 130 adjacent to the wheel hub attachment portion 230. The bearing spacer 220 abuts the mounting flange 260 when the roller bearing 210b is in position on the wheel hub attachment portion 230. The bearing retainer 250 and the mounting flange 260 thereby indirectly retain the wheel hub 120 in place about the wheel hub attachment portion 230, with the bearing retainer 250 retaining the roller bearing 210a against the outer retaining shoulder 224 and the mounting flange 260 retaining the bearing spacer 220 and the roller bearing 210b against the inner retaining shoulder 222. However, in various embodiments, the wheel hub 120 may be mounted on the spindle 130 by other methods, and the disclosure of the bearing retainer 250 and the mounting flange 260 should not be considered limiting.

The brake assembly 150 is coupled both to the wheel hub 120 and to the spindle 130. In the current embodiment, the brake assembly 150 is indirectly coupled to the spindle 130 by a brake adapter 270 coupled to the mounting flange 260. The brake assembly 150 is a wet disc brake assembly, though other brake assemblies may be used in various embodiments. The brake assembly 150 includes a plurality of friction discs 254 and a plurality of separator plates 256 within a piston housing 258. A separator plate 256 is placed between each friction disc 254. In the current embodiment, there are ten friction discs 254 and nine separator plates 256, though other numbers of friction discs 254 and separator plates 256 may be present in various embodiments, and the number of friction discs 254 and separator plates 256 should not be considered limiting. A pair of dampers 282a,b are placed on either side of the plurality of friction discs 254 and the plurality of separator plates 256. The brake assembly 150 also includes a ring gear 284 and an inner gear 286. The ring gear 284 is coupled to the spindle 130 through the piston housing 258 and the brake adapter 270, and the inner gear 286 is coupled to the wheel hub 120, so that the inner gear 286 rotates relative to the ring gear 284 as the wheel hub 120 rotates relative to the spindle 130. The ring gear 284 is internally splined to retain the dampers 282a,b and the separator plates 256, and the inner gear 286 is splined to retain the friction discs 254. The friction discs 254 therefore rotate with the inner gear 286 relative to the ring gear 284 and thereby rotate relative to the separator plates 256 and the dampers 282a,b.

A hydraulic piston 280 is mounted in the piston housing 258 and is movable to apply or remove compressive force to the damper 282b, and thereby the separator plates 256, the friction discs 254, and the damper 282a. When the piston 280 is forced against the damper 282b, the piston 280 forces the friction discs 254 against the dampers 282a,b and the separator plates 256, thereby slowing and stopping rotation of the friction discs 254, and thereby the inner gear 286 and the wheel hub 120, relative to the separator plates 256, the dampers 282a,b, the ring gear 284, and the spindle 130, braking the wheel hub 120 relative to the spindle 130.

In the current embodiment, due to heat generated by the friction between the friction discs 254, the separator plates 256, the dampers 282a,b, and the piston 280, the brake assembly 150 is a heat-generating device and cooling the brake assembly 150 with hydraulic oil is required to protect the integrity of all components of the brake assembly 150. Cooled hydraulic oil is pumped from a hoist cylinder system of the vehicle through a series of priority valves and an oil cooling radiator to an upper portion 290 of the brake assembly 150, where it flows by gravity into the space between the wheel hub 120 and the spindle 130. Prior to modification of the wheel assembly 100, the hydraulic oil may flow through the roller bearings 210a,b, providing lubrication for the roller bearings 210a,b. The wheel hub 120 also includes a pair of notched divider flanges 226a,b extending radially inward adjacent to the outer retaining shoulder 224 and the inner retaining shoulder 222, respectively. The notched divider flanges 226a,b are notched to allow oil to flow throughout the space between the wheel hub 120 and the spindle 130 and into the roller bearings 210a,b. The bearing retainer 250 prevents hydraulic oil from entering the interior of the spindle 130, and the cover 140 prevents hydraulic oil from exiting the space between the wheel hub 120 and the spindle 130. The hydraulic oil may flow around the wheel hub attachment portion 230 and down to a lower portion 292 of the brake assembly 150, where it is pumped back to a main hydraulic tank (not shown) of the vehicle and back to the upper portion 290 to cycle the hydraulic oil back through the brake assembly 150 and the space between the wheel hub 120 and the spindle 130. A plurality of cooling ports 294 are defined in the inner gear 286 and spaced around the circumference of the inner gear 286 to allow for flow of hydraulic oil in and around the friction discs 254, the separator plates 256, the dampers 282a,b, and the piston 280.

However, while the hydraulic oil is used both to cool and lubricate the brake assembly 150 and to lubricate and cool the roller bearings 210a,b, the hydraulic oil is specifically designed for use in the brake assembly 150. Thus the hydraulic oil may not be the best oil for lubrication and cooling of the roller bearings 210a,b. Heat from the brake assembly 150 or other heat-generating devices may heat the hydraulic oil and lower the viscosity of the oil, adding to wear on the roller bearings 210*a,b*, or the hydraulic oil may be contaminated from the brake assembly 150 or other systems of the vehicle, carrying the contaminates into the roller bearings 210*a,b*. It may be desirable to use separate oils for the brake assembly 150 and for the roller bearings 210*a,b*. Therefore it may be desirable to modify the wheel assembly 100 such that a bearing oil may be used around the roller bearings 210*a,b* and the hydraulic oil may be used in the brake assembly 150. In various embodiments, the bearing oil may have a viscosity near or above 100 Saybolt Seconds (20 Centistokes) at 212 degrees Fahrenheit (100 degrees Celsius), such as 80 W-90 oil, though other oils of different viscosities may be used as bearing oil in various embodiments. It may also be desirable to provide rare earth magnets within the bearing oil to collect metallic contaminates that may be generated by or introduced into the system.

Figure 3:
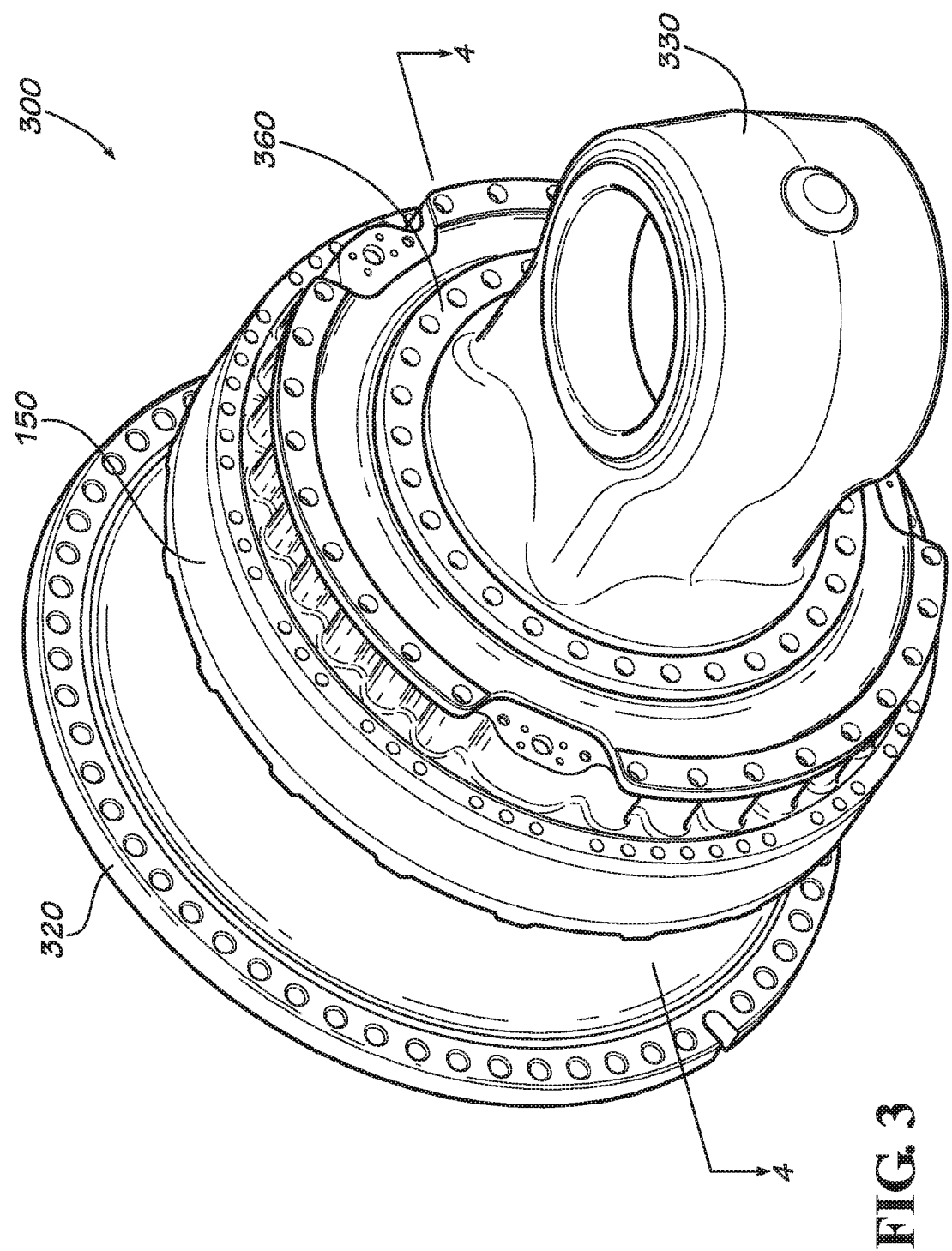
FIG. 3 is a perspective view of a wheel assembly in accord with embodiments of the current disclosure.
Figure 4:
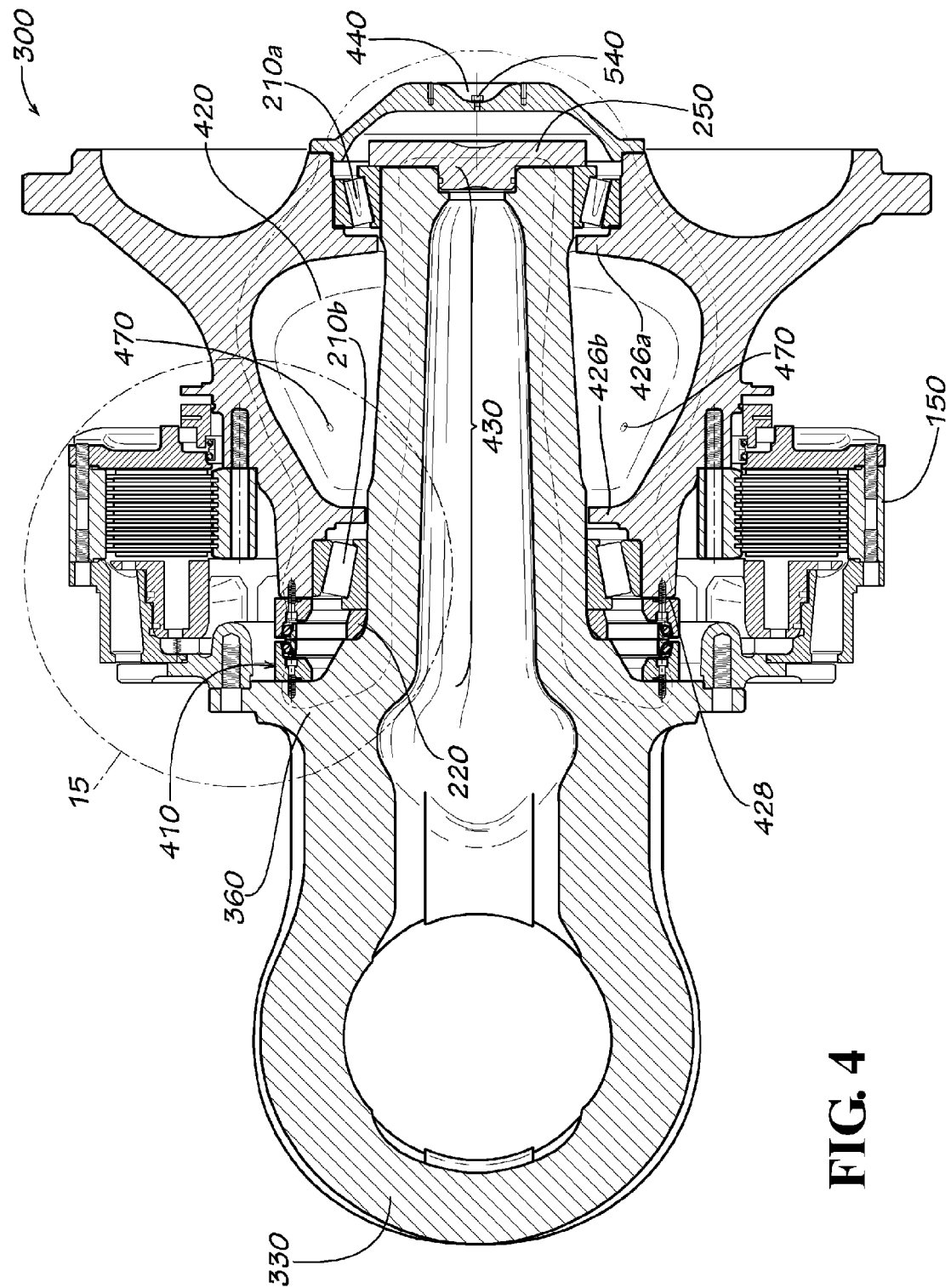
FIG. 4 is a cross-sectional view of the wheel assembly of FIG. 3 taken along line 4-4.

FIG. 3 shows a modified wheel assembly 300 without any bolts connecting the components of modified wheel assembly 300. The wheel assembly 300 includes the brake assembly 150. The wheel assembly 300 also includes a modified wheel hub 320 and a modified spindle 330, which are modified over the wheel hub 120 and the spindle 130 as described below. FIG. 4 shows a cross-sectional view of the wheel assembly 300 taken along lines 4-4 as shown in FIG. 3. As shown in FIG. 4, the wheel assembly 300 also includes the roller bearings 210*a,b*, the bearing spacer 220, the bearing retainer 250, and a modified cover 440. The modified cover 440 is modified over the cover 140 as described below. Further, the wheel assembly 300 includes a seal 410 between the wheel hub 320 and the spindle 330. In the current embodiment, the seal 410 is located between a mounting flange 360 of the spindle 330 and an inner end 428 of the wheel hub 120, though in various embodiments the seal 410 may be located in various locations between the spindle 330 and the wheel hub 320.

In combination with the wheel hub 320, the spindle 330, the bearing retainer 250, and the cover 440, the seal 410 forms a sealed cavity 420 between the wheel hub 320 and the spindle 330. In various embodiments, the cover 440 and/or the bearing retainer 250 may be part of the sealed cavity 420. The sealed cavity 420 contains the roller bearings 210*a,b* and isolates the roller bearings 210*a,b* from the brake assembly 150. The sealed cavity 420 may therefore be filled with bearing oil. A pair of notched divider flanges 426*a,b* similar to notched divider flanges 226*a,b* are also located within the sealed cavity 420 in the current embodiment. The wheel hub 320 may also include a plurality of radial holes 470 extending radially through the wheel hub 320. In the current embodiment, wheel hub 320 includes eight radial holes 470 spaced around the wheel hub 320, though any number of radial holes 470 may be present in various embodiments. Radial holes 470 may be plugged to seal sealed cavity 420, and may be drilled as necessary to increase the radius of radial holes 470 to fit plugs.

Figure 5:
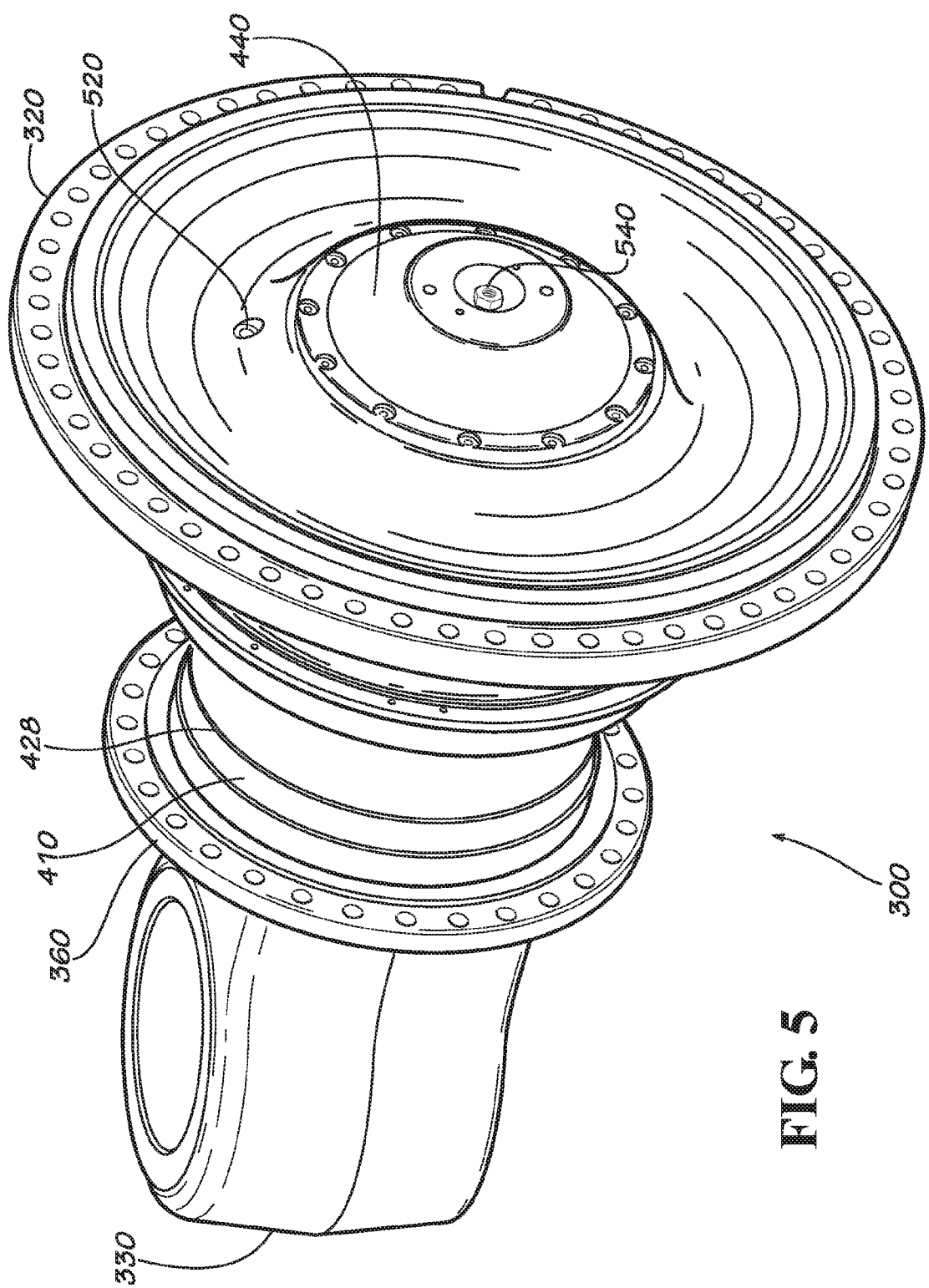
FIG. 5 is a perspective view of a wheel assembly in accord with embodiments of the current disclosure.

FIG. 5 shows a perspective view of the wheel assembly 300 with the brake assembly 150 removed. As shown in FIG. 5, the seal 410 extends completely around the circumference of the wheel hub 320 and the spindle 330 between the inner end 428 of the wheel hub 320 and the mounting flange 360 of the spindle 330. Wheel hub 320 also includes an axially-extending drainage port 520 extending to sealed cavity 420 at a radially-outermost edge of the sealed cavity 420. The drainage port 520 is pluggable to seal sealed cavity 420.

FIG. 5 also shows the cover 440 including a check valve 540. In the current embodiment, the check valve 540 is located in the cover 440, though the check valve 540 may be located in various locations in the wheel assembly 300 in various embodiments. The check valve 540, in the current embodiment, is a bolt with a bore defined therethrough and a spring and ball located in the bore. The spring biases the ball against a seat defined in the bore proximate to an end of the check valve 540 facing inward into the sealed cavity 420. When pressure within the sealed cavity 420 forces the ball against the spring away from the seat, pressure within the sealed cavity 420 is relieved through the check valve 540 to lower pressure within the sealed cavity 420 until the spring forces the ball back against the seat. Air pressure may build within the sealed cavity 420 due heat generated during operation of the wheel assembly 300, and the check valve 540 allows the excess air pressure to be relieved from the sealed cavity 420, functioning as a check safety valve.

Figure 6:
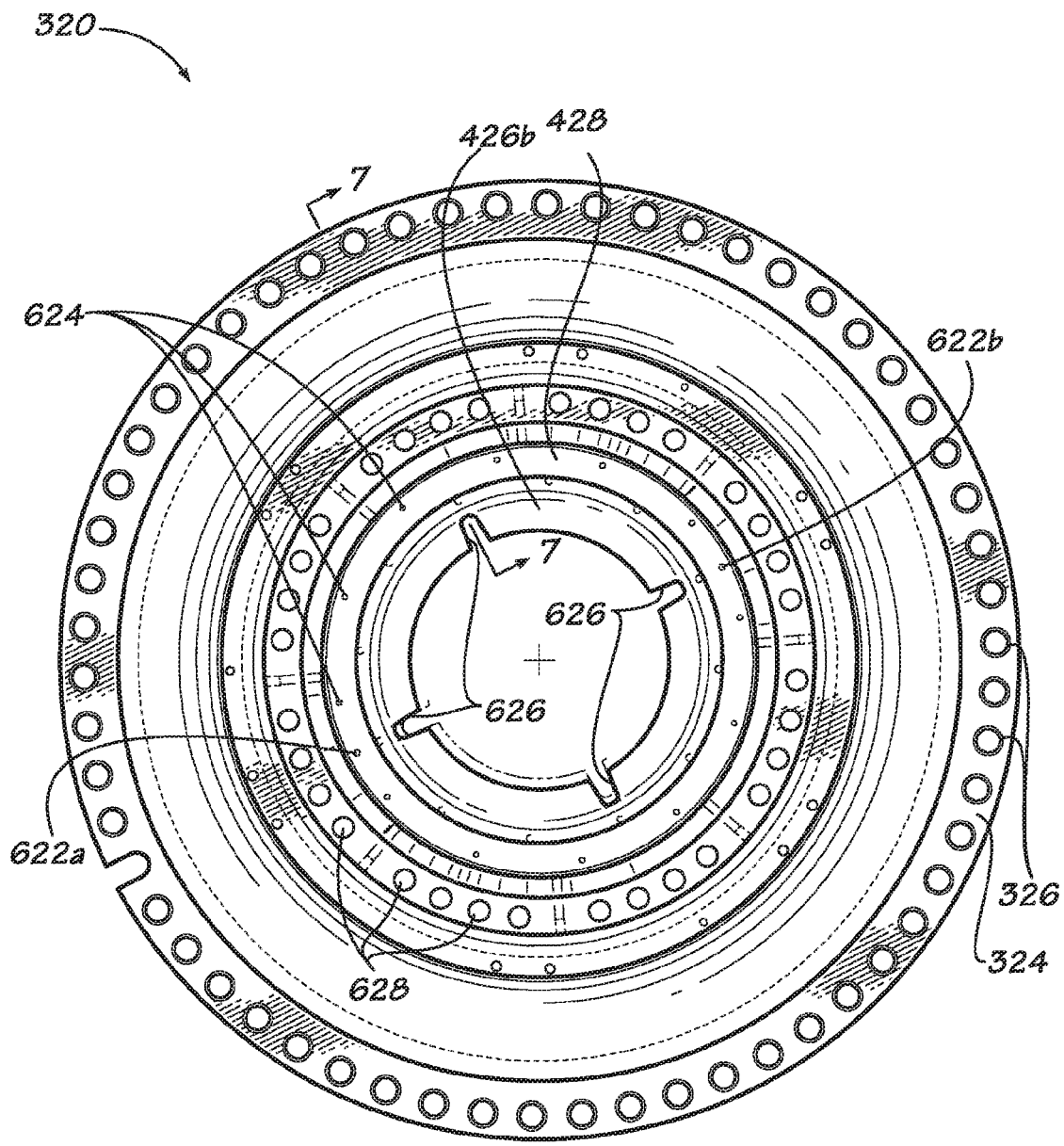
FIG. 6 is a back view of a wheel hub of a wheel assembly in accord with embodiments of the current disclosure.

FIG. 6 shows a back view of the wheel hub 320. As shown in FIG. 6, the inner end 428 of the wheel hub 320 includes a plurality of bolt holes 624 for mounting of the seal 410 on the inner end 428. The inner end 428 also includes a pair of dowel holes 622*a,b* for insertion of dowel pins to align the seal 410 on the inner end 428. The plurality of bolt holes 624 and the pair of dowel holes 622*a,b* are modifications added to the wheel hub 120 to create wheel hub 320. FIG. 6 also shows wheel flange 324 including a plurality of bolt holes 326 sized to accept the plurality of bolts 122 for bolting a tire to the wheel hub 320. FIG. 6 also shows a plurality of bolt holes 628 for mounting the brake assembly 150 on the wheel hub 320. Any number of dowel holes 622, bolt holes 624, bolt holes 326, or bolt holes 628 may be provided in various embodiments.

FIG. 6 also shows the notched divider flange 426*b*. The notched divider flange 426*b* includes a plurality of notches 626. In the current embodiment, notched divider flange 426*b* includes four notches 626, but in various embodiments any number of notches 626 may be provided. Notched divider flange 426*a* is similarly notched to notched divider flange 426*b* in the current embodiment.

Figure 7:
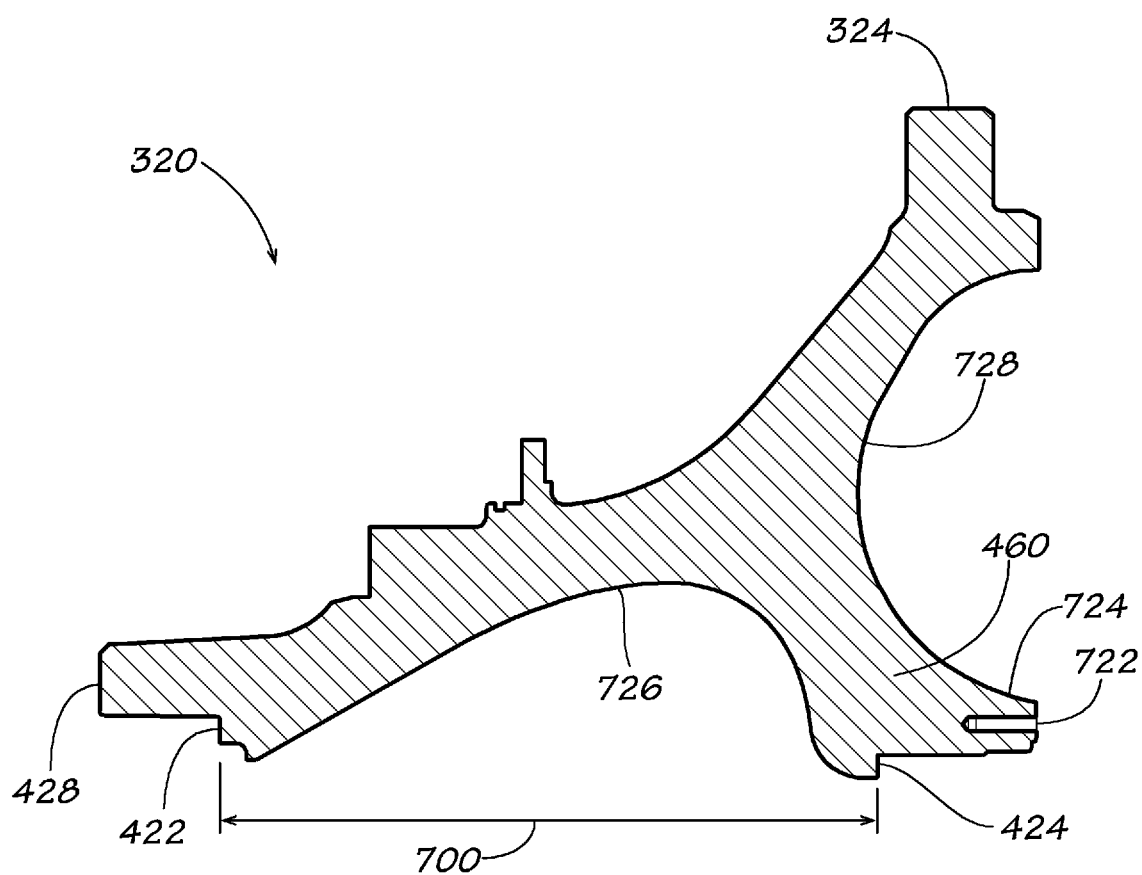
FIG. 7 is a cross-sectional view of the wheel hub of FIG. 6 taken along line 7-7.

FIG. 7 shows a cross-sectional view of the wheel hub 320 taken along line 7-7 in FIG. 6. Wheel hub 320 includes a plurality of cover bolt holes 722 for attachment of the cover 440 on a cover rim 724 of the wheel hub 320. In the current embodiment, the wheel hub 320 includes twelve cover bolt holes 722 spaced evenly along the cover rim 724, though any number of cover bolt holes 722 may be present in various embodiments. FIG. 7 also shows an inner retaining shoulder 422, similar to inner retaining shoulder 222, formed in the inner end 428 of the wheel hub 320 and an outer retaining shoulder 424, similar to outer retaining shoulder 224, formed in an outer end 460 of the wheel hub 320. The distance between the inner retaining shoulder 422 and the outer retaining shoulder 424 is a wheel hub clearance distance 700. FIG. 7 also shows that wheel hub 320 includes an inner channel 726 and an outer channel 728. The inner channel 726 forms part of the sealed cavity 420, though the inner channel 726 may not be included in the wheel hub 320 in various embodiments. The outer channel 728 may be a transition between the wheel flange 324 and the cover rim 724, though the outer channel 728 may not be included in the wheel hub 320 in various embodiments.

Figure 8:
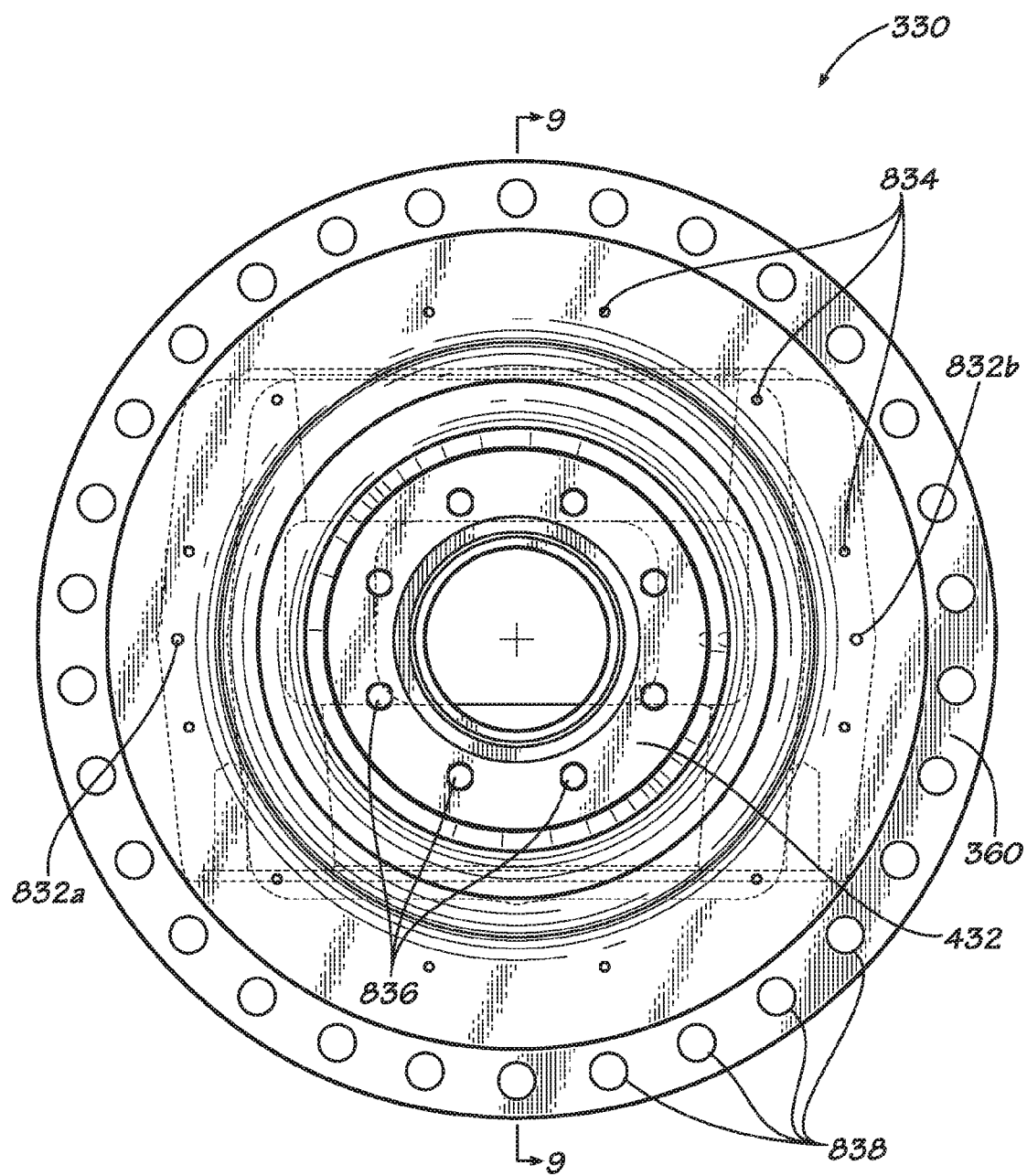
FIG. 8 is a front view of a spindle of a wheel assembly in accord with embodiments of the current disclosure.

FIG. 8 shows a front view of the spindle 330. As shown in FIG. 8, the mounting flange 360 of the spindle 330 includes a plurality of bolt holes 834 for mounting of the seal 410 on the inner end 428. The mounting flange 360 also includes a pair of dowel holes 832*a,b* for insertion of dowel pins to alight the seal 410 on the mounting flange 360. The plurality of bolt holes 834 and the pair of dowel holes 832*a,b* are modifications added to the spindle 130 to create spindle 330. FIG. 8 also shows an outer end 432 of the spindle 330 includes a plurality of bolt holes 836 sized to accept the plurality of bolts 252 extending through the bearing retainer 250. FIG. 8 also shows a plurality of bolt holes 838 formed on the mounting flange 360 for mounting the brake assembly 150 on the spindle 330. Any number of dowel holes 832, bolt holes 834, bolt holes 836, or bolt holes 838 may be provided in various embodiments.

Figure 9:
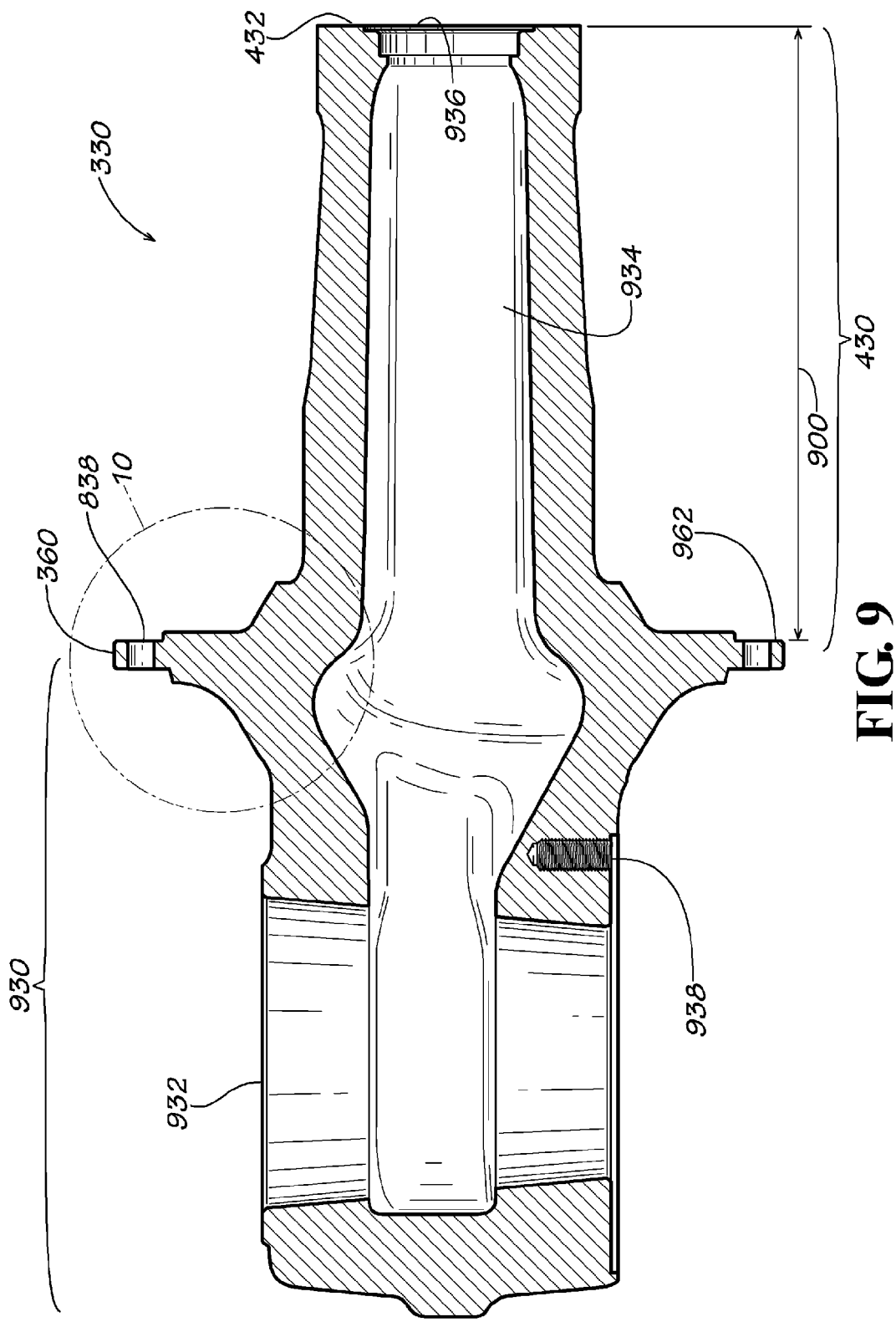
FIG. 9 is a cross-sectional view of the spindle of FIG. 8 taken along line 9-9.

FIG. 9 shows a cross-sectional view of the spindle 330 taken along line 9-9 in FIG. 8. As shown in FIG. 9, the spindle 330 includes an inner cavity 934 extending from a mounting bore 932, similar to mounting bore 132, to an outer opening 936 defined in the outer end 432. However, in various embodiments, the spindle 330 may not include an inner cavity 934, and the disclosure of inner cavity 934 should not be considered limiting. In various embodiments, outer opening 936 may not be present, and outer end 432 may be closed. The spindle 330 also includes a plurality of bolt holes 938 spaced around a lower end of the mounting bore 932 for mounting the spindle 330 on the suspension cylinder 110. The spindle 330 includes 25 bolt holes 938, though any number of bolt holes 938 may be present in various embodiments. The plurality of bolt holes 838 are also show in FIG. 9 in a bolt hole portion 962 of the mounting flange 360. The distance between the outer end 432 of the spindle 330 and the bolt hole portion 962 of the mounting flange 360 is a first spindle clearance distance 900.

Figure 10:
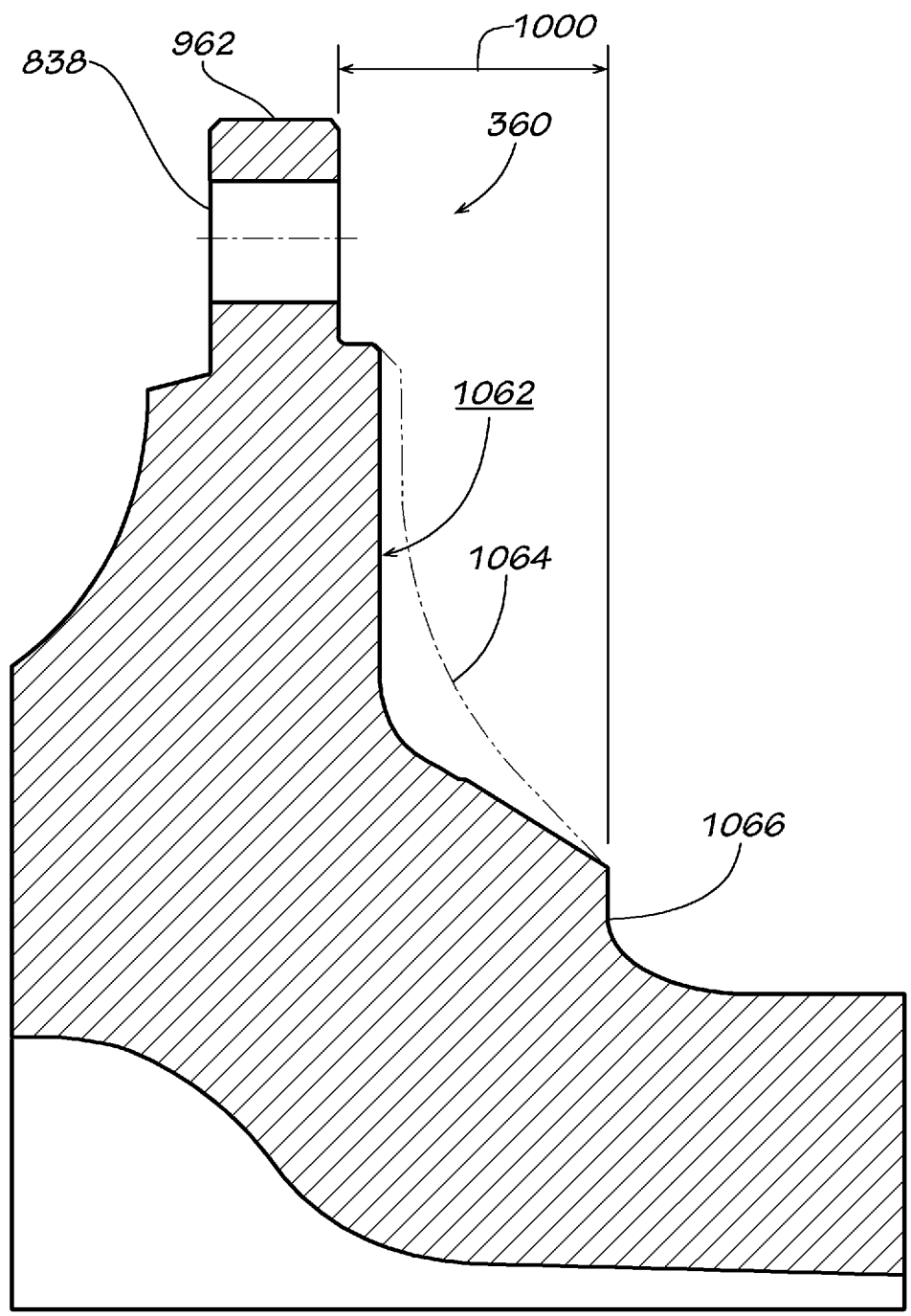
FIG. 10 is a detail cross-sectional view of a mounting flange of the spindle of FIG. 8 taken from detail 10 shown in FIG. 9.

FIG. 10 shows a detail cross-sectional view of the mounting flange 360 of the spindle 330. As shown in FIG. 10, the mounting flange 360 includes a seal mounting surface 1062. The plurality of bolt holes 834 and the pair of dowel holes 832a,b are defined in the seal mounting surface 1062. The seal mounting surface 1062 is a modification in the spindle 330 over the spindle 130, formed by a cutout 1064 in the mounting flange 260 to create mounting flange 360. Cutout 1064 creates flat seal mounting surface 1062 to allow for easy mounting of the seal 410 on the spindle 330. Cutout 1064 may be made by any process known in the art, including machining. However, in various embodiments, the cutout 1064 may not be included and the seal 410 may be mounted directly on unmodified spindle 130 or another modified spindle 330 not including the cutout 1064. FIG. 10 also shows a bearing spacer shoulder 1066 included in divider flange 360. The bearing spacer shoulder 1066 abuts the bearing spacer 220, providing a stop for the bearing spacer 220 in order for the bearing spacer 220 to hold the roller bearing 210b in place with the inner retaining shoulder 422. The distance between the bearing spacer shoulder 1066 and the bolt hole portion 962 of the mounting flange 360 is a second spindle clearance distance 1000.

Figure 11:
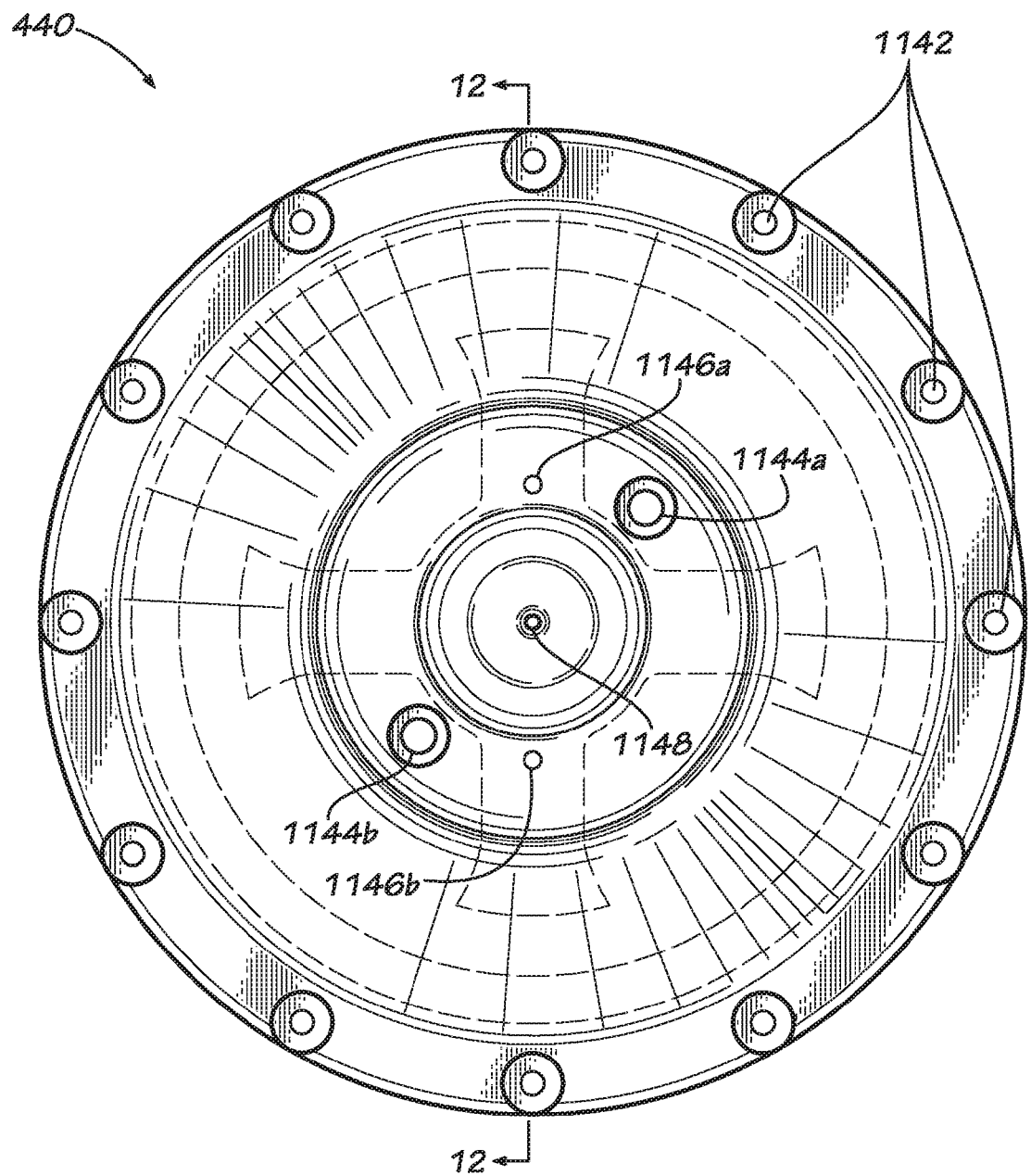
FIG. 11 is a front view of a cover of the wheel assembly in accord with embodiments of the current disclosure.

FIG. 11 shows a front view of the cover 440. As shown in FIG. 11, the cover 440 includes a plurality of bolt holes 1142 sized to accept the plurality of bolts 142 (show in FIG. 1) to allow the cover 440 to be mounted on the wheel hub 320. The cover 440 also includes a pair of bolt holes 1144a,b extending through the cover 440 and a pair of screw holes 1146a,b. The cover 440 also includes a threaded check valve bore 1148 sized to accept the threaded check valve 540 (shown in FIG. 5). The check valve bore 1148 is a modification of the cover 440 over the cover 140. Any number of bolt holes 1142, bolt holes 1144, or screw holes 1146a,b may be present in various embodiments.

Figure 12:
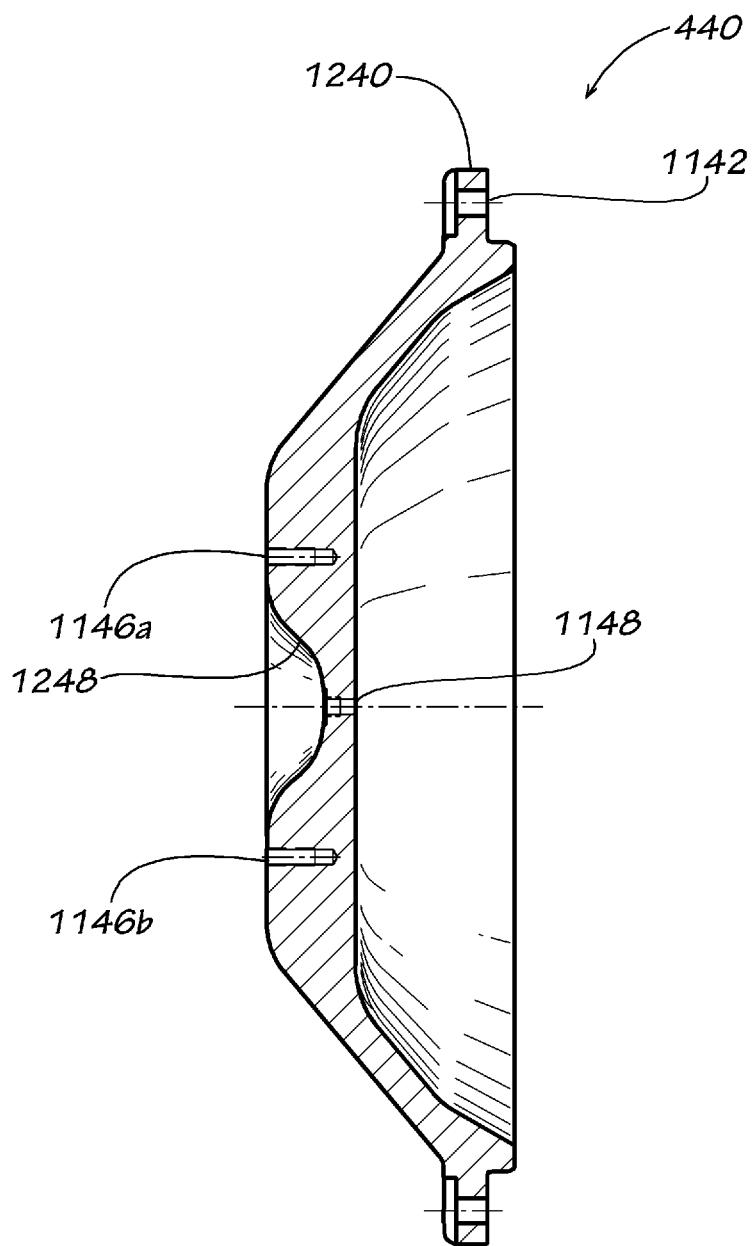
FIG. 12 is a cross-sectional view of the cover of FIG. 11 taken along line 12-12.

FIG. 12 shows a cross-sectional view of the cover 440 taken along line 12-12 in FIG. 11. As shown in FIG. 12, the cover 440 includes a cover mounting flange 1240. The plurality of bolt holes 1142 extend through the cover mounting flange 1240. FIG. 12 also shows that the pair of screw holes 1146a,b do not extend completely through the cover 440.

FIG. 12 also shows that the check valve bore 1148 is defined within a recess 1248 defined in an exterior of the cover 440.

Figure 13:
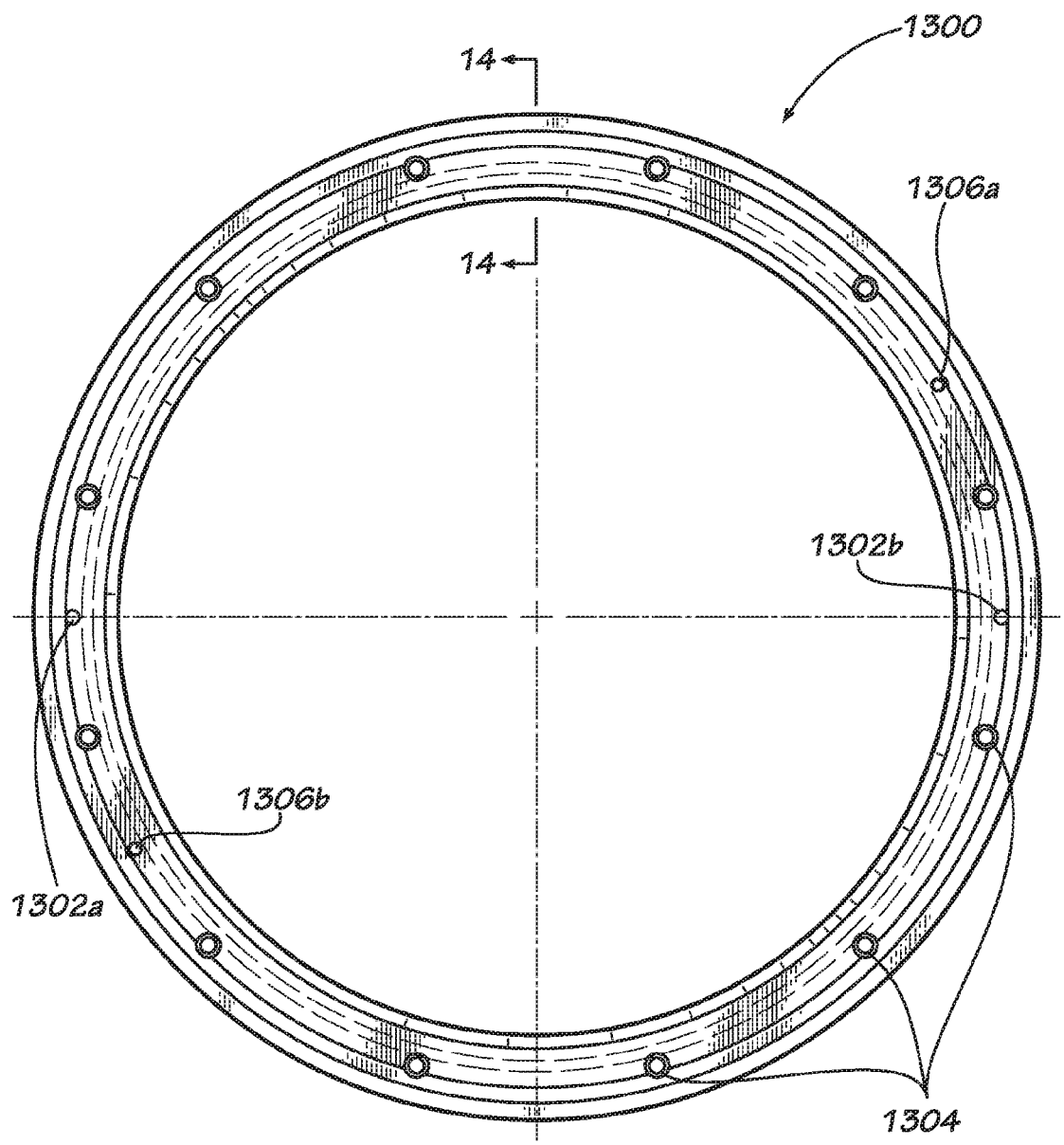
FIG. 13 is a front view of a seal retainer of a wheel assembly in accord with embodiments of the current disclosure.

FIG. 13 shows a seal retainer 1300 of the seal 410. As shown in FIG. 13, in the current embodiment, the seal retainer 1300 is ring-shaped and includes a plurality of bolt holes 1304, a pair of dowel holes 1302a,b, and a pair of threaded holes 1306a,b. The dowel holes 1302a,b are sized to accept a pair of dowels and align the dowel holes 1302a,b with the dowel holes 622a,b of the wheel hub 320 or the dowel holes 832a,b of the spindle 330, respectively, thereby aligning the seal retainer 1300 with the wheel hub 320 or the spindle 330. The plurality of bolt holes 1304 are spaced to align with the plurality of bolt holes 624 of the wheel hub 320 or the plurality of bolt holes 834 of the spindle 330, thereby permitting the seal retainer 1300 to be coupled with the wheel hub 320 or the spindle 330. The dowel holes 1302a,b provide more precise alignment than the bolt holes 1304, though the dowel holes 1302a,b may not be present in various embodiments, and the seal retainer 1300 may be attached to the wheel hub 320 or the spindle 330 by other methods in various embodiments, including welding, gluing, or being formed integrally with the wheel hub 320 or the spindle 330. The threaded holes 1306a,b may function as jack screw holes and be used to separate the seal retainer 1300 from the wheel hub 320 or the spindle 330 by threading a pair of bolt through the threaded holes 1306a,b to push against the wheel hub 320 or the spindle 330, though the threaded holes 1306a,b may not be present in various embodiments. Any number of bolts holes 1304, dowel holes 1302, and threaded holes 1306 may be present in various embodiments.

Figure 14:
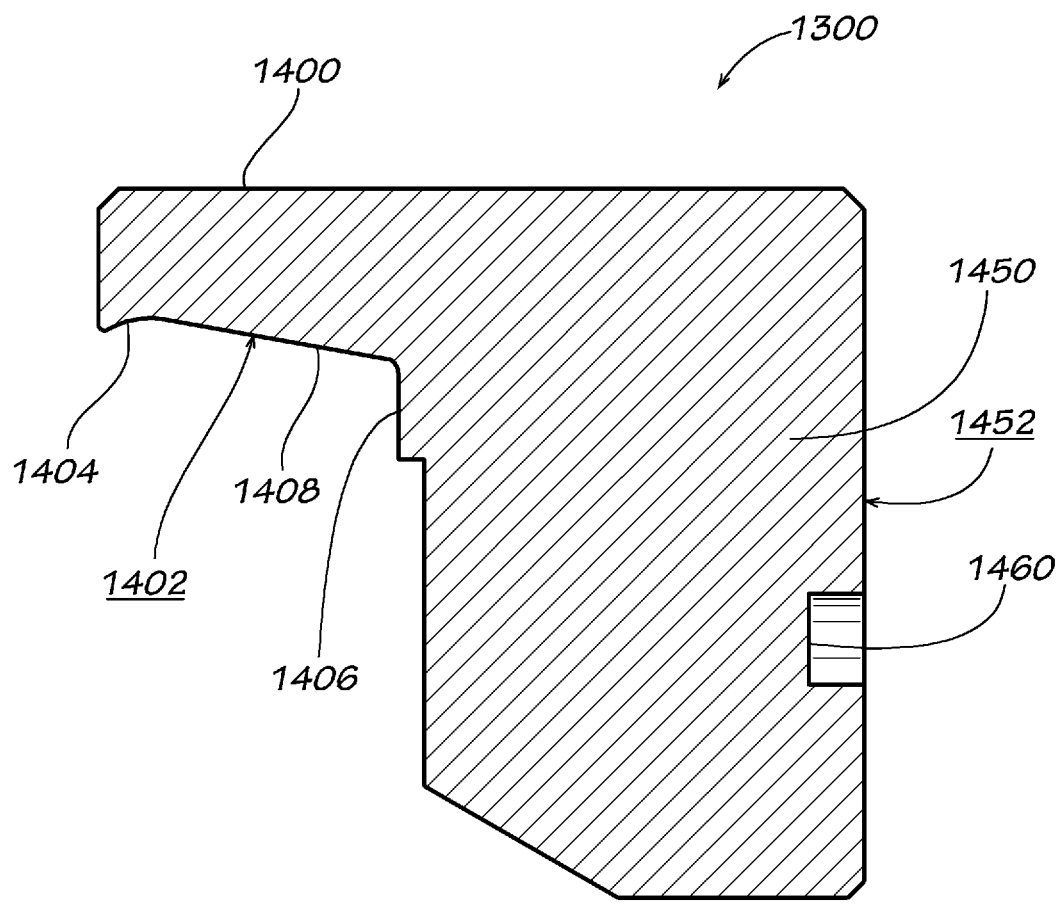
FIG. 14 is a cross-sectional view of the seal retainer of FIG. 13 taken along line 14-14.

FIG. 14 shows a cross-sectional view of the seal retainer 1300 taken along line 14-14 in FIG. 13. As shown in FIG. 14, the seal retainer 1300 is L-shaped in the current embodiment, having a retaining lip 1400 extending from axially from a main body 1450 of the seal retainer 1300. The retaining lip 1400 defines an O-ring sealing surface 1402 extending from a catch lip 1404 to an O-ring stop shoulder 1406. The O-ring sealing surface 1402 thereby defines a taper 1408 sloping axially and radially inward towards the main body 1450. The seal retainer 1300 also defines a mounting surface 1452 in the main body 1450 that may be placed in sealing engagement with the wheel hub 320 or the spindle 330. The seal retainer 1300 also includes an O-ring channel 1460 defined in the mounting surface 1452 of the main body 1450.

Figure 15:
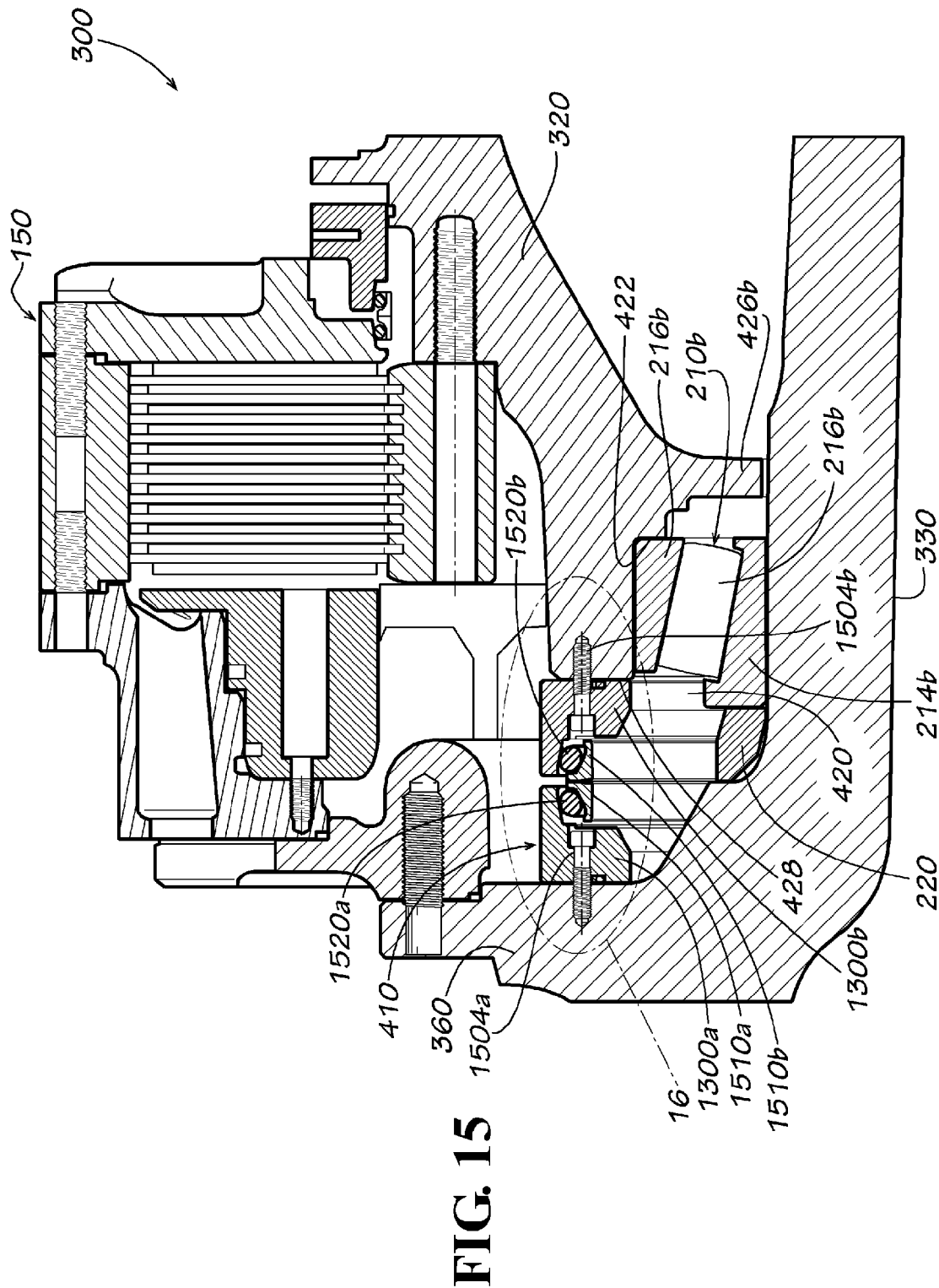
FIG. 15 is a detail cross-sectional view of the wheel assembly of FIG. 4 taken from detail 15 shown in FIG. 4.

FIG. 15 shows a detail cross-sectional view of detail 15 in FIG. 4. As shown in FIG. 15, the seal 410 is mounted in the wheel assembly 300 between the wheel hub 320 and the spindle 330. The seal 410 separates the brake assembly 150 from the roller bearings 210a,b, forming the sealed cavity 420 between wheel hub 320 and spindle 330. In the current embodiment, the seal 410 is a mechanical face seal, though other seals 410 separating the brake assembly 150 from the sealed cavity 420 may be present in various embodiments.

The seal 410 includes two seal retainers 1300a,b. Seal retainer 1300a is mounted to the mounting flange 360 of the spindle 330 by a plurality of bolts 1504a and seal retainer 1300b is mounted to the inner end 428 of the wheel hub 320 by a plurality of bolts 1504b. The seal 410 also includes a pair of seal rings 1510a,b and a pair of O-rings 1520a,b. The seal rings 1510a,b are metallic in the current embodiment, being made of Duronit V cast iron, though other materials may be used in various embodiments. The O-rings 1520a,b are Hydrogenated Nitrile-Butadiene-Rubber ("HNBR") in the current embodiment, though other materials may be used in various embodiments, such as Nitrile-Butadiene-Rubber ("NBR"), Silicone-Rubber ("VBR"), or Flourinated-Rubber ("FPM"). The seal retainer 1300a retains the seal ring 1510a and the O-ring 1520a, and the seal retainer 1300b retains the seal ring 1510b and the O-ring 1520b. Seal rings 1510a,b also contact each other.

Figure 16:
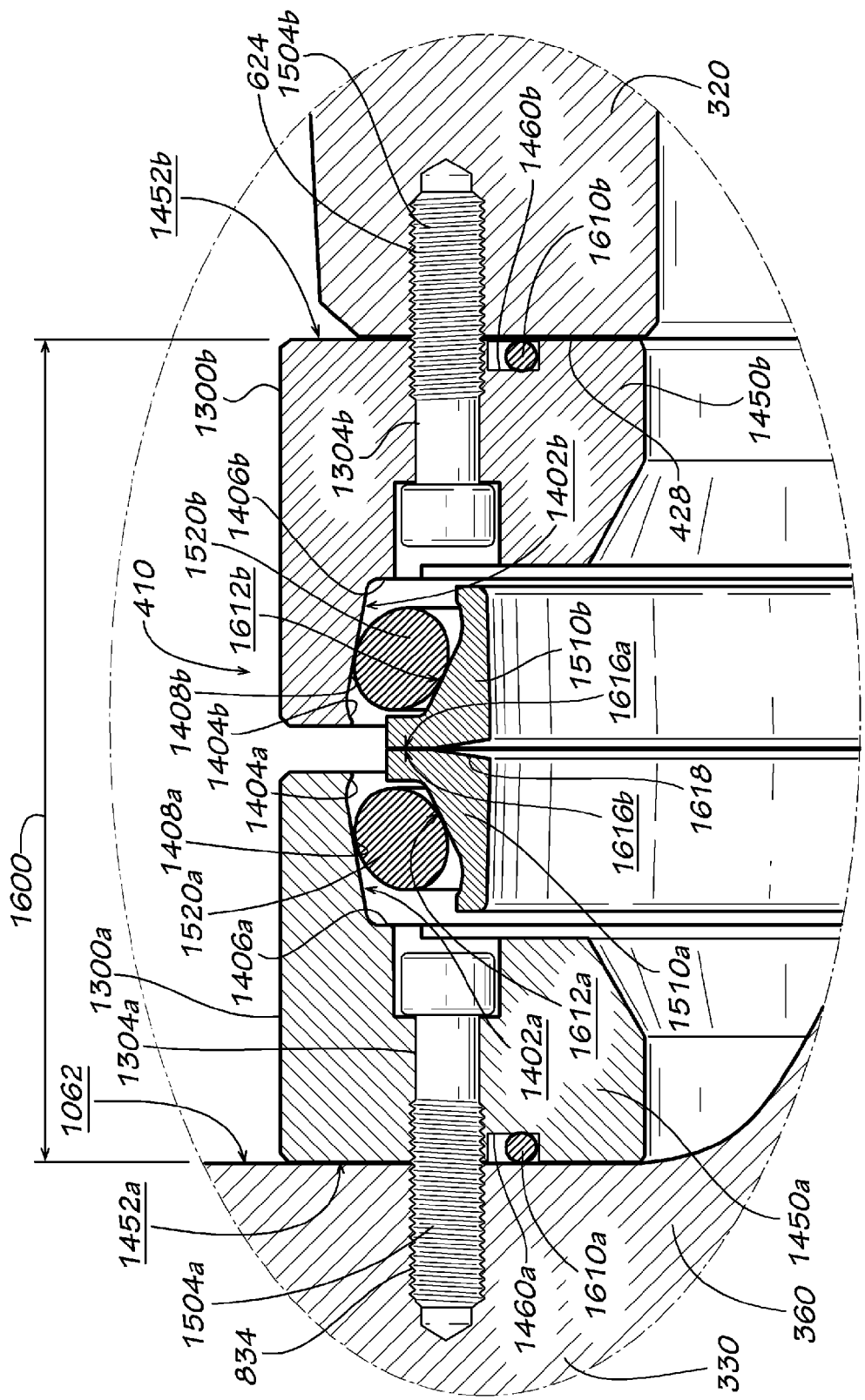
FIG. 16 is a detail cross-sectional view of a seal of the wheel assembly of FIG. 4 taken from detail 16 shown in FIG. 15.

FIG. 16 shows a detail cross-sectional view of detail 16 in FIG. 15. As shown in FIG. 16, the seal retainer 1300a is mounted to the mounting flange 360 of the spindle 330 by the plurality of bolts 1504a extending through a plurality of bolt holes 1304a of the seal retainer 1300a and through the plurality of bolt holes 834 of the mounting flange 360 when mounting surface 1452a of the seal retainer 1300a contacts the seal mounting surface 1062 of the mounting flange 360 and when the pair of dowel holes 1302a,b of the seal retainer 1300a align with the pair of dowel holes 832a,b of the mounting flange 360, respectively. The pair of dowel holes 1302a,b of the seal retainer 1300a align with the pair of dowel holes 832a,b of the mounting flange 360 of the spindle 330 when dowel pins are inserted in the pair of dowel holes 832a,b of the mounting flange 360 and the seal retainer 1300a is thereafter placed against the mounting flange 360 so that the pair of dowel holes 1302a,b of the seal retainer 1300a accept the dowel pins. In various embodiments the dowel pins may be placed in the pair of dowel holes 1302a,b of the seal retainer 1300a first.

The seal retainer 1300b is mounted to the inner end 428 of the wheel hub 320 by the plurality of bolts 1504b extending through a plurality of bolt holes 1304b of the seal retainer 1300b and through the plurality of bolt holes 624 of the inner end 428 when mounting surface 1452b of the seal retainer 1300b contacts the inner end 428 of the wheel hub 320 and when the pair of dowel holes 1302a,b of the seal retainer 1300b align with the pair of dowel holes 622a,b of the inner end 428 of the wheel hub 320, respectively. The pair of dowel holes 1302a,b of the seal retainer 1300b align with the pair of dowel holes 622a,b of the inner end 428 of the wheel hub 320 when dowel pins are inserted in the pair of dowel holes 622a,b of the inner end 428 of the wheel hub 320 and the seal retainer 1300b is thereafter placed against the inner end 428 so that the pair of dowel holes 1302a,b of the seal retainer 1300b accept the dowel pins. In various embodiments the dowel pins may be placed in the pair of dowel holes 1302a,b of the seal retainer 1300b first.

FIG. 16 also shows that, in the current embodiment, the seal 410 includes a pair of O-rings 1610a,b disposed within O-ring channels 1460a,b of the seal retainers 1300a,b, respectively. O-ring 1610a thereby provides a fluid seal between the seal retainer 1300a and seal mounting surface 1062 of the mounting flange 360, and O-ring 1610b thereby provides a fluid seal between the seal retainer 1300b and inner end 428 of the wheel hub 320.

FIG. 16 also shows the interaction of the seal retainer 1300a,b, the seal rings 1510a,b, and the O-rings 1520a,b. The seal rings 1510a,b are each L-shaped and include a face sealing surface 1616a,b and an O-ring sealing surface 1612a,b, respectively. The face sealing surfaces 1616a,b face axially towards each other and contact each other. In the current embodiment, the face sealing surfaces 1616a,b are polished to allow the face sealing surfaces 1616a,b to slide easily against each other to allow rotation of the face sealing surfaces 1616a,b, and thereby the wheel hub 320 and the spindle 330, relative to each other while providing a fluid-tight seal between the seal rings 1510a,b. The face sealing surfaces 1616a,b taper away from each other towards a radially inward portion of each seal ring 1510a,b, forming a wedge-shaped gap 1618 facing into the sealing cavity 420 to allow for bearing oil to lubricate and cool the face sealing surfaces 1616a,b during rotation and for any potential wear of the face sealing surfaces 1616a,b to cause the face sealing surfaces 1616a,b to shift towards the gap 1618.

The O-ring sealing surfaces 1612a,b each contact the O-rings 1520a,b, respectively, which contact the O-ring sealing surfaces 1402a,b, of the seal retainers 1300a,b. The O-rings 1520a,b thereby seal the space between the seal retainers 1300a,b and the seal rings 1510a,b, respectively. The O-rings 1520a,b have a diameter sized to bias the O-rings 1520a,b towards catch lips 1404a,b of the seal retainers 1300a,b, respectively. However, when the seal rings 1510a,b contact each other along face sealing surface 1616a,b, the O-ring sealing surfaces 1612a,b of the seal rings 1510a,b provide a wedging action, pushing the O-rings 1520a,b radially inward along the O-ring sealing surfaces 1402a,b of the seal retainers 1300a,b, respectively. This wedging action strengthens the seal of the O-rings 1520a,b against the O-ring sealing surfaces 1402a,b of the seal retainers 1300a,b and against the O-ring sealing surfaces 1612a,b of the seal rings 1510a,b, respectively. When the wheel hub 320 rotates, the seal retainer 1300b rotates with the wheel hub 320, rotating the O-ring 1520b and thereby the seal ring 1510b, and the seal 410 thereby seals the sealed cavity 420 while allowing the wheel hub 320 and the spindle 330 to rotate relative to each other.

FIG. 16 also shows the distance between the seal mounting surface 1062 and the inner end 428, which is also the axial width 1600 of the seal 410. The axial width 1600 may be measured to determine the size of the cutout 1064 to form mounting flange 360. In the current embodiment, the cutout 1064 is sized to allow for the seal 410 to fit between the spindle 330 and the wheel hub 320 within a range of distances between the spindle 330 and the wheel hub 320 based on a tolerance of the seal 410. Cutouts 1064, all of the same size, may therefore be machined into multiple wheel assemblies 100 so long as the distance between the spindle 230 and the wheel hub 220 of each wheel assembly 100 is within the range of the tolerance of the seal 410.

To modify the wheel assembly 100 to create wheel assembly 300, the wheel hub 120 is removed from attachment to the spindle 130 by removing the cover 140, the bearing retainer 250, and roller bearing 210a and detaching brake assembly 150 from the spindle 130 and then from the wheel hub 120. The size of the cutout 1064 necessary to create axial width 1600 between the inner end 428 of the spindle 330 and the seal mounting surface 1062 of the spindle 330 may be measured after removing the brake assembly 150 and before removing the wheel hub 120 from the spindle 130. In embodiments where the size of the cutout 1064 is previously known or calculated to allow for the tolerance of the seal 410, no measurement may be taken.

After removing the wheel hub 120, inner end 228 of the wheel hub 120 may be modified with the plurality of bolt holes 624 and the pair of dowel holes 622a,b by drilling and/or tapping to create modified wheel hub 320. The inner end 228 may also be machined to form a mounting surface in various embodiments, and a datum reference point such as the inner retaining shoulder 222 may be used to precisely machine the inner end 228 to the desired dimensions. The wheel hub clearance distance 700 may then be measured, as well as the first spindle clearance distance 900 and the second spindle clearance distance 1000. The size of the cutout 1064 may thereafter be calculated, if not already known and if not measured after removal of the brake assembly 150, using the first spindle clearance distance 900, the second spindle clearance distance 1000, the wheel hub clearance distance 700, the axial width of the bearing spacer 220, the axial width of both roller bearings 210a,b, and any gap between the bearing retainer 250 and the outer end 432 of the spindle 330. Any gap between the bearing retainer 250 and the outer end 432 of the spindle 330 may be shimmed in various embodiments.

The cutout 1064 is thereafter formed by machining or other known methods, creating seal mounting surface 1062. The cutout 1064 may be formed relative to a datum reference point such as the bearing spacer shoulder 1066 to ensure that the cutout 1064 is precisely sized. The plurality of bolt holes 834 and the pair of dowel holes 832a,b are then added by drilling and/or tapping, creating modified spindle 330. Prior to installing the seal retainers 1300a,b on the spindle 330 and the wheel hub 320, respectively, the O-rings 1520a,b and the seal rings 1510a,b may be installed on each seal retainer 1300a,b, respectively. The seal retainer 1300a may then be doweled and bolted to the seal mounting surface 1062 of the spindle 330 and the seal retainer 1300b may be doweled and bolted to the inner end 428 of the wheel hub 320. The wheel hub 320 may thereafter be mounted on the spindle 330 with bearing spacer 220, roller bearings 210a,b, bearing retainer 250, placing the face sealing surfaces 1616a,b in contact with each other, thereby forming seal 410.

The cover 140 may be modified by drilling and taping check valve bore 1148, creating cover 440. The threaded check valve 540 may then be threaded into the check valve bore 1148. The cover 440 may be mounted on the wheel hub 320, thereby forming sealed cavity 420. The sealed cavity 420 may thereafter be filled with bearing oil. In the current embodiment the sealed cavity 420 may be injected with between 13 and 15 gallons of bearing oil, though different amounts of bearing oil may be used in various embodiments. Bearing oil may be injected through one of the pair of bolt holes 1144a,b or any other holes through any of the cover 440, the wheel hub 320, the spindle 330, the bearing retainer 250, or any other opening that provides access to the interior of the sealed cavity 420. Bearing oil may be injected in the lower of the bolt holes 1144a,b to prevent the oil level within the sealed cavity 420 from rising to or above the check valve bore 1148, preventing oil from entering the check valve 540. To drain bearing oil from the sealed cavity 420, the wheel hub 320 may be rotated to place drainage port 520 at the lowest point of the sealed cavity 420 and the drainage port 520 may be unplugged, allowing the bearing oil to drain from the sealed cavity 420.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A wheel assembly comprising:
   a spindle;
   a wheel hub rotatable relative to the spindle;
   a seal mounted between the spindle and the wheel hub, the spindle, the wheel hub, and the seal defining a sealed cavity, the seal coupled to an inner end of the wheel hub and a mounting flange of the spindle; and
   a bearing mounted between the spindle and the wheel hub within the sealed cavity, the wheel hub configured to rotate on the bearing relative to the spindle.

2. The wheel assembly of claim 1, wherein the seal is coupled to a seal mounting surface defined on the inner end of the wheel hub, the seal mounting surface facing an axial direction.

3. The wheel assembly of claim 1, wherein the seal is coupled to a seal mounting surface defined on the mounting flange of the spindle, the seal mounting surface facing an axial direction.

4. The wheel assembly of claim 1, further comprising a plurality of bolts coupling the seal to the inner end of the wheel hub and the mounting flange of the spindle.

5. The wheel assembly of claim 1, wherein the seal comprises:
   a first O-ring contacting the inner end of the wheel hub; and
   a second O-ring contacting the mounting flange of the spindle.

6. The wheel assembly of claim 1, further comprising a brake assembly coupled to the wheel hub and the spindle outside of the sealed cavity.

7. The wheel assembly of claim 1, further comprising a cover coupled to the wheel hub, the cover further defining the sealed cavity, wherein a check valve is mounted in a check valve bore defined in the cover.

8. A wheel assembly comprising:
   a spindle;
   a wheel hub rotatable relative to the spindle;
   a seal mounted between the spindle and the wheel hub, the spindle, the wheel hub, and the seal defining a sealed cavity, the seal comprising a first portion coupled to the wheel hub and a second portion coupled to the spindle, the first portion configured to rotate relative to the second portion about an axis, the first portion defining a first face sealing surface and the second portion defining a second face sealing surface contacting the first face sealing surface, the first face sealing surface and the second face sealing surface facing in axial directions defined by the axis of the seal; and
   a bearing mounted between the spindle and the wheel hub within the sealed cavity, the wheel hub configured to rotate on the bearing relative to the spindle.

9. The wheel assembly of claim 8, wherein the first portion comprises a first seal retainer coupled to the wheel hub and the second portion comprises a second seal retainer coupled to the spindle.

10. The wheel assembly of claim 9, wherein the first seal retainer and the second seal retainer are L-shaped.

11. The wheel assembly of claim 9, wherein the first portion comprises a first O-ring and the second portion comprises a second O-ring, the first O-ring and the second O-ring positioned between the first seal retainer and the second seal retainer.

12. The wheel assembly of claim 9, wherein the first portion comprises a first seal ring and the second portion comprises a second seal ring, the first seal ring and the second seal ring positioned between the first seal retainer and the second seal retainer, the first seal ring defining the first face sealing surface and the second seal ring defining the second face sealing surface.

13. The wheel assembly of claim 8, wherein the first portion comprises a first seal ring and the second portion comprises a second seal ring, the first seal ring defining the first face sealing surface and the second seal ring defining the second face sealing surface, and wherein the first seal ring and the second seal ring are metallic.

14. A method of forming a sealed cavity in a wheel assembly, the wheel assembly comprising a wheel hub, a spindle, a heat-generating device, and at least one bearing, the wheel hub rotatable relative to the spindle, the method comprising:

mounting a seal on an inner end of the wheel hub and a mounting flange of the spindle, the seal separating the at least one bearing from the heat-generating device;

creating a sealed cavity between the wheel hub and the spindle with the seal, the at least one bearing mounted within the sealed cavity; and filling bearing oil into the sealed cavity.

15. The method of claim 14, wherein the heat-generating device is a brake assembly.

16. The method of claim 14, wherein the seal comprises a first portion coupled to the wheel hub and a second portion coupled to the spindle, the first portion configured to rotate relative to the second portion about an axis, the first portion defining a first face sealing surface and the second portion defining a second face sealing surface contacting the first face sealing surface, the first face sealing surface and the second face sealing surface facing in axial directions defined by the axis of the seal.

17. The method of claim 16, wherein the first portion comprises a first seal retainer coupled to the wheel hub and the second portion comprises a second seal retainer coupled to the spindle.

18. The method of claim 17, wherein the first portion comprises a first O-ring and the second portion comprises a second O-ring, the first O-ring and the second O-ring positioned between the first seal retainer and the second seal retainer.

19. The method of claim 14, wherein mounting the seal between the wheel hub and the spindle includes machining a surface of a mounting flange of the spindle.

20. The method of claim 14, wherein the wheel assembly further includes a cover coupled to the wheel hub, the wheel hub, the cover, the spindle, and the seal forming the sealed cavity, the method further comprising installing a check valve in the cover.

* * * * *